(12) United States Patent
Nagarajan et al.

(10) Patent No.: US 8,548,333 B2
(45) Date of Patent: Oct. 1, 2013

(54) TRANSCEIVER PHOTONIC INTEGRATED CIRCUIT

(75) Inventors: Radhakrishnan L. Nagarajan, Cupertino, CA (US); Masaki Kato, Palo Alto, CA (US); Fred A. Kish, Jr., Palo Alto, CA (US); David F. Welch, Atherton, CA (US); Charles H. Joyner, Haleiwa, HI (US)

(73) Assignee: Infinera Corporation, Sunnyvale, CA (US)

( * ) Notice: Subject to any disclaimer, the term of this patent is extended or adjusted under 35 U.S.C. 154(b) by 521 days.

(21) Appl. No.: 12/753,833

(22) Filed: Apr. 2, 2010

(65) Prior Publication Data

US 2011/0243556 A1 Oct. 6, 2011

(51) Int. Cl.
*H04B 10/00* (2013.01)
(52) U.S. Cl.
USPC .............................. 398/138; 398/139; 398/164
(58) Field of Classification Search
USPC ................................... 398/135–139, 163–164
See application file for complete search history.

(56) References Cited

U.S. PATENT DOCUMENTS

| | | | |
|---|---|---|---|
| 5,121,241 A | | 6/1992 | Veith |
| 8,145,059 B2* | | 3/2012 | Yu ................................. 398/136 |
| 2003/0072060 A1* | | 4/2003 | Sourani .......................... 359/172 |
| 2004/0264977 A1* | | 12/2004 | Yap et al. ........................ 398/161 |
| 2006/0098699 A1* | | 5/2006 | Sanchez ........................... 372/26 |
| 2007/0154221 A1* | | 7/2007 | McNicol et al. ............... 398/135 |
| 2010/0021166 A1* | | 1/2010 | Way ................................. 398/79 |
| 2010/0183306 A1* | | 7/2010 | Pangrac et al. .................. 398/72 |

OTHER PUBLICATIONS

International Preliminary Report on Patentability in International application No. PCT/US2011/031015.

* cited by examiner

*Primary Examiner* — Dzung Tran
(74) *Attorney, Agent, or Firm* — Ross M. Carothers; David L. Soltz

(57) ABSTRACT

The present invention provides for a transceiver comprising a transmitter portion and a receiver portion. The transmitter portion includes a laser, the laser providing an optical signal having one of a plurality of wavelengths. The optical signal from the laser is modulated to create a first wavelength-division multiplexed signal at an output of the transceiver. The optical signal from the laser is also used by a demultiplexer to demultiplexer a second wavelength-division multiplexed signal at an input of the transceiver. The use of the optical signal from the laser in both modulation and demodulation of wavelength-division multiplexed signals results in a transceiver having fewer discrete components resulting in a compact design and reduced costs.

34 Claims, 12 Drawing Sheets

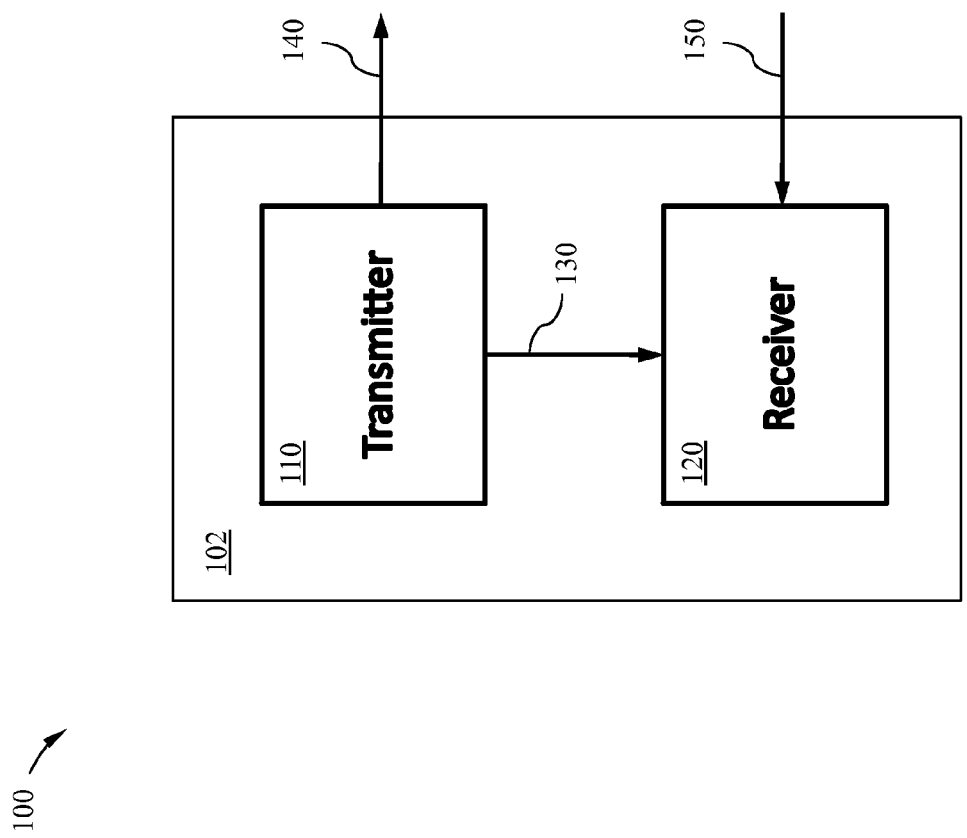

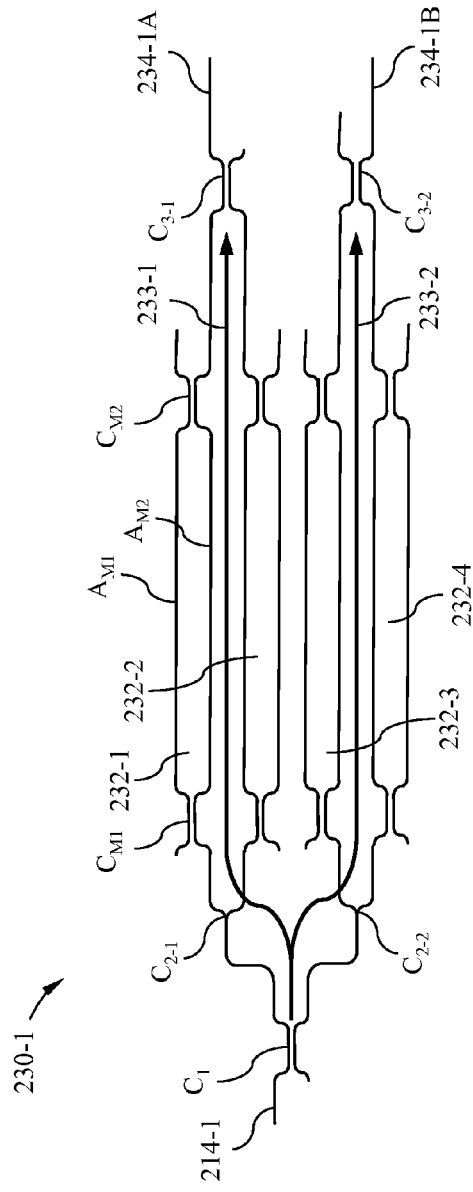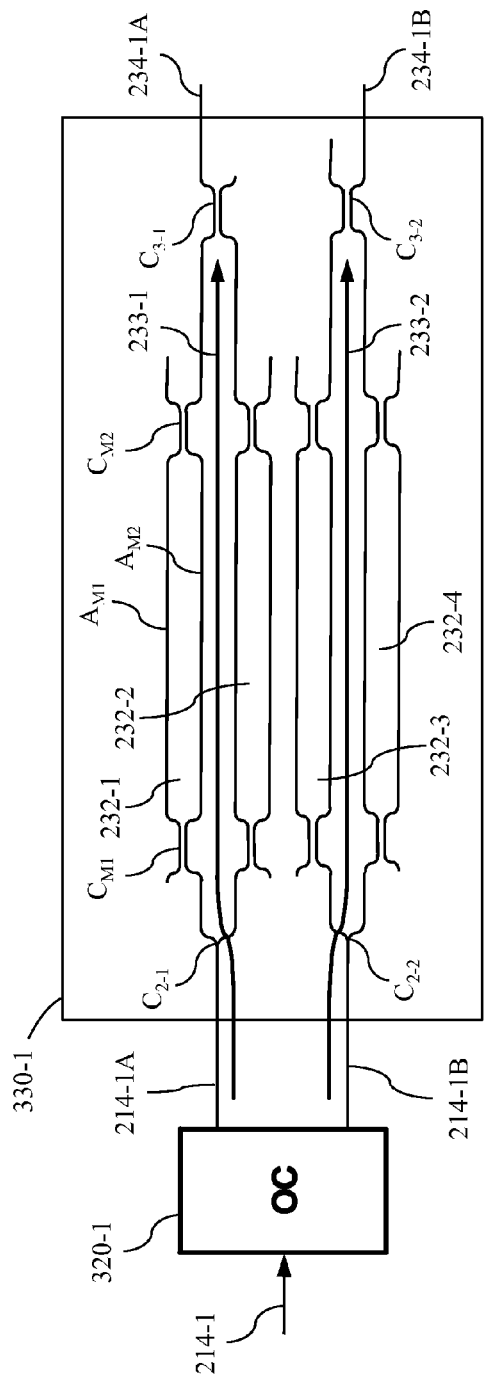
FIG. 3A
FIG. 3B

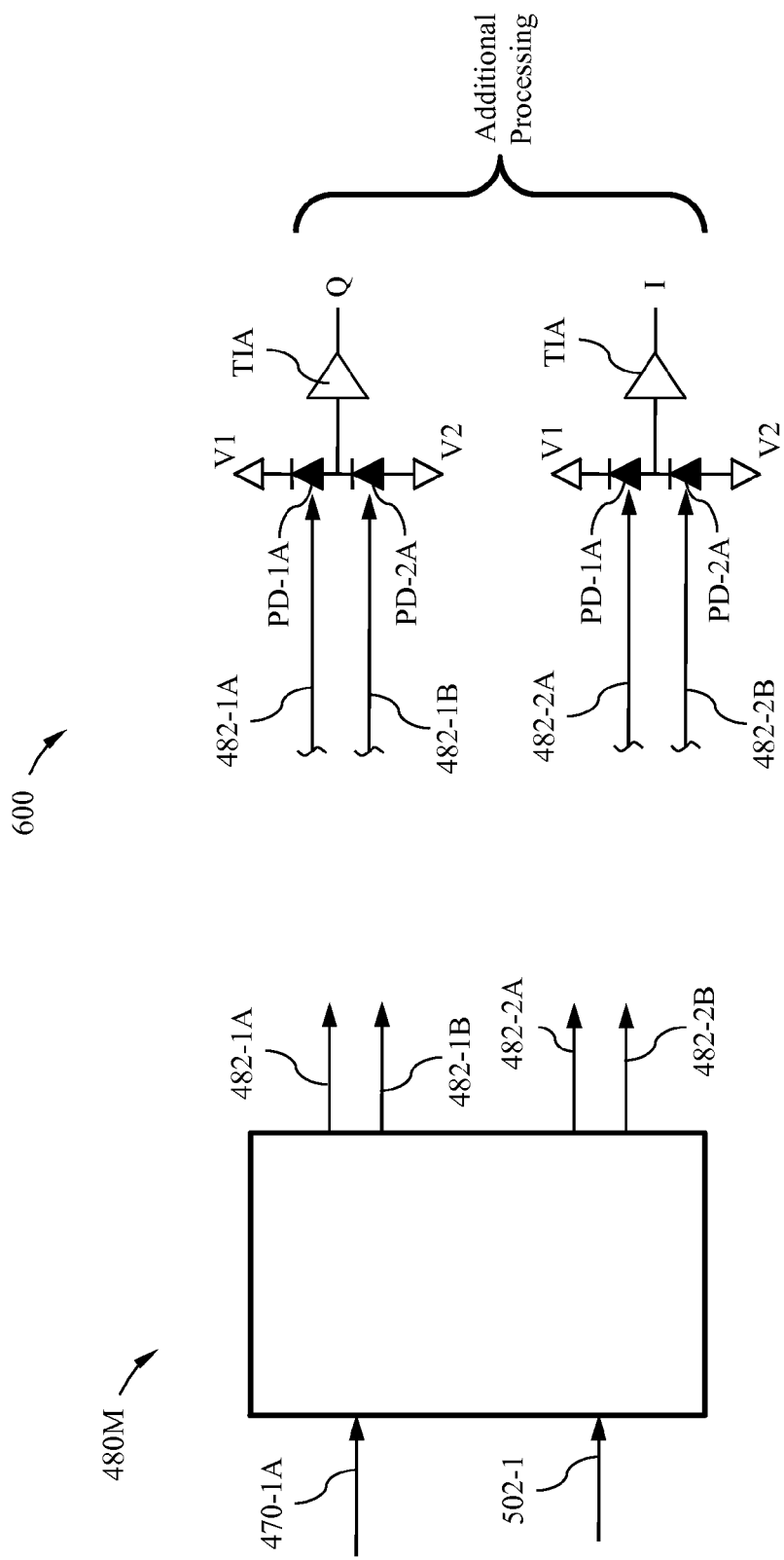

TRANSCEIVER PHOTONIC INTEGRATED CIRCUIT

BACKGROUND OF THE INVENTION

1. Field of the Invention

This invention relates generally to optical telecommunication systems and, more particularly, to transceivers comprising photonic integrated circuits employed in such systems.

2. Description of the Related Art

Wavelength-division multiplexed (WDM) optical communication systems are known in which multiple optical signals, each having a different wavelength, are combined onto a single optical fiber. Such systems typically include transmitters at an ingress of a network infrastructure of the optical communication system and receivers at an egress of the network infrastructure. Exemplary transmitters may include a plurality of signal channels, each including a laser associated with a particular wavelength, a modulator configured to modulate the output of the laser to provide a modulated signal, and an optical combiner to combine each of the modulated signals into a multiplexed output for delivery over the network infrastructure of the optical communication system. Exemplary receivers may include a demultiplexer to demultiplex the received multiplexed output, as well as other components which convert the received modulated signals into corresponding signals in the electrical domain.

Conventionally, WDM systems have been constructed from discrete components. For example, the lasers, modulators, combiners, and decombiners have be packaged separately and provided on a printed circuit board. More recently, however, many WDM components have been integrated onto a single chip, also referred to a photonic integrated circuit (PIC).

In order to further increase the data rates associated with WDM systems, various modulation formats have been proposed for generating the modulated laser output. One such optical signal modulation format, known as polarization multiplexed differential quadrature phase-shift keying ("Pol Mux DQPSK"), can provide spectral densities with higher data rates per unit of fiber bandwidth than other modulation formats, such as on-off keying (OOK).

However, systems designed to transmit and receive Pol Mux DQPSK signals, however, typically have additional components, both active and passive, and greater complexity than transmitters and receivers designed for use with other modulating techniques.

Additionally, some systems which include coherent receivers designed to receive polarization multiplexed signals, such as Pol Mux DQPSK or Pol Mux QPSK signals for example, may require a local oscillator. The local oscillator is used in the demodulation process, the phase of the local oscillator being compared to a phase of the incoming signal, a Pol Mux DQPSK signal for example, the change in phase indicative of the data received.

Thus, there is a need to integrate components associated with a PM DQPSK transmitter and receiver, referred herein as a transceiver, on a single photonic integrated circuit in order to realize a WDM system transceiver having few discrete components resulting in a compact design leading to reduced costs.

SUMMARY OF THE INVENTION

Consistent with the present disclosure, a transceiver is provided that comprises a transmitter portion and a receiver portion. The transmitter portion includes a laser and a modulator, the laser providing an optical signal having one of a plurality of wavelengths for example. The modulator is configured to receive a first portion of the optical signal and provide a first modulated output signal in response to the first portion. Also provided is a multiplexer circuit coupled to the modulator, the multiplexer circuit being configured to receive the first modulated output signal and provide a first multiplexed signal at an output of the transceiver. The transceiver also includes a demultiplexer circuit to receive a second multiplexed signal at an input of the transceiver and provide a second modulated output signal. An optical hybrid circuit is provided which receives a second portion of the optical signal of the laser on a first input and the second modulated output signal on a second input.

In additional embodiments of the present invention, the modulator is configured to receive a first portion of an optical signal of a laser and provide first and second modulated output signals in response to the first portion. A polarization multiplexer circuit coupled to the modulator may also be provided, the polarization multiplexer circuit being configured to receive the first and second modulated output signals and provide a first polarization multiplexed signal at an output of the transceiver. The transceiver may also include a polarization demultiplexer circuit to receive a second polarization multiplexed signal at an input of the transceiver and provide third and fourth modulated output signals. A first optical hybrid circuit may be provided which receives a second portion of the optical signal of the laser on a first input and the third modulated output signal on a second input, and a second optical hybrid circuit may be provided which receives the second portion of the optical signal of the laser on a first input and the fourth modulated output signal on a second input. Additional embodiments include the multiplexer and the demultiplexer circuits of the transceiver provided on the same substrate as the laser or lasers.

Consistent with a further aspect of this disclosure, an optical coupler is provided on the substrate, the optical coupler is configured to receive the optical signal from the laser, or a portion thereof, and provide the first and second portions of the optical signal on first and second outputs of the coupler. Alternatively, a plurality of optical couplers are provided, the plurality of optical couplers cooperating to provide various portions of the optical signal from the laser to other elements of the transceiver, as needed or desired.

Consistent with still further aspects of the present disclosure, the transceiver comprises one or more amplitude varying elements which may act to amplify, attenuate, or amplify and attenuate the amplitude of one or more of the optical signals propagating through the transceiver. Such optical signals may, for example, be multiplexed optical signals. In some embodiments, such amplitude varying elements may include semiconductor optical amplifiers, variable optical attenuators, or photodiodes.

Consistent with other aspects of the present disclosure, a control system circuit is provided. The control system circuit may, for example, be provided as part of a feedback loop to control an operating characteristic of a laser, such as optical power or optical wavelength for example. Consistent with additional aspects of the present disclosure, the transceiver includes a plurality of such lasers provided on single substrate.

It is to be understood that both the foregoing general description and the following detailed description are exemplary and explanatory only and are not restrictive of the invention, as claimed. Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. In the drawings wherein like reference symbols refer to like parts:

FIG. 1 is a block diagram of an optical transceiver consistent with various aspects of the present disclosure;

FIGS. 3A and 3B are exemplary modulator circuits, consistent with various aspects of the present disclosure;

FIG. 5B is a block diagram of a multi-mode interference coupler, consistent with various aspects of the present disclosure;

FIG. 6 is an exemplary processing circuit, consistent with various aspects of the present disclosure;

DETAILED DESCRIPTION OF THE INVENTION

Figure 2A:
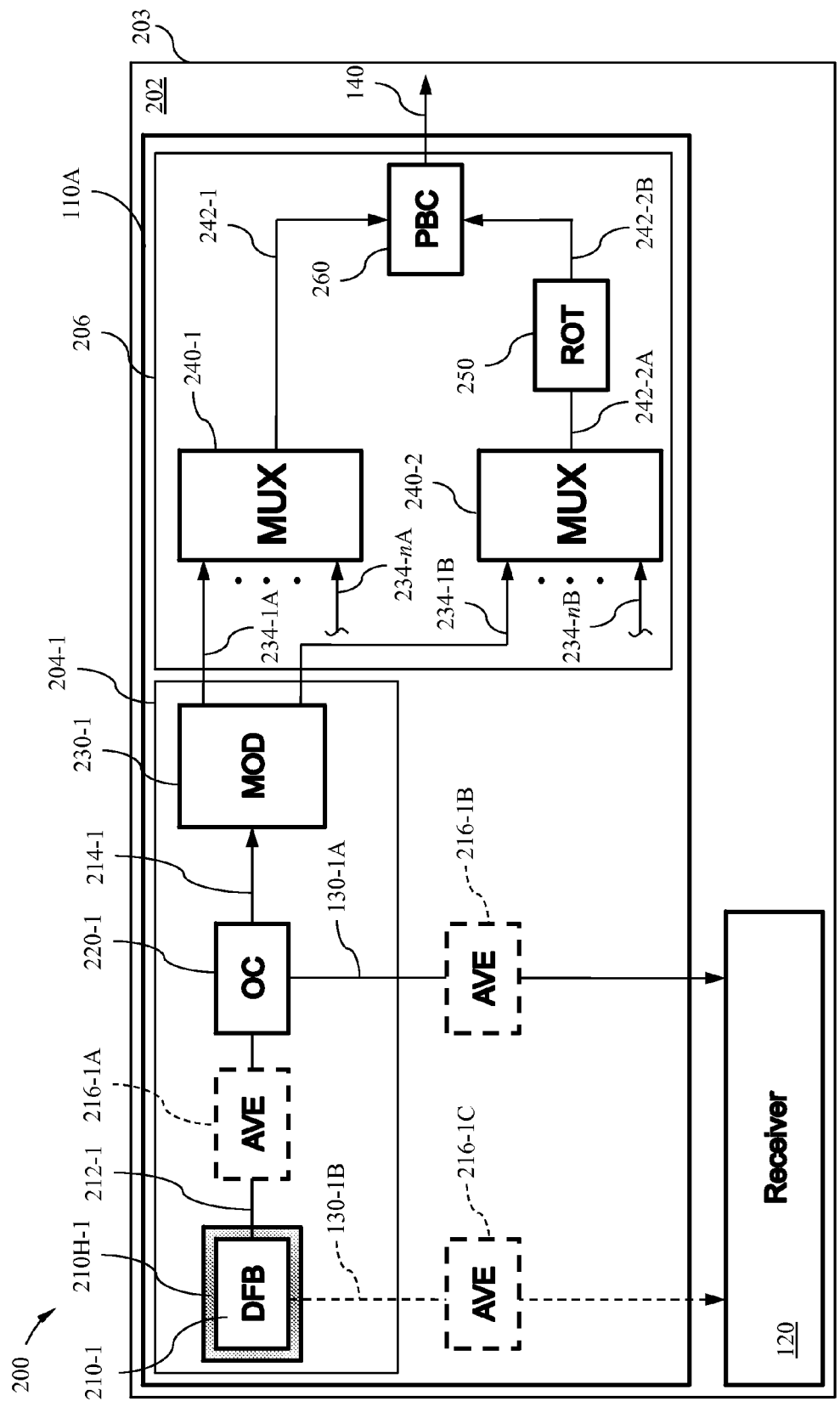
FIG. 2A is a block diagram of a first portion of the optical transceiver of FIG. 1, consistent with various aspects of the present disclosure.

A coherent optical transceiver circuit is disclosed in which various components of the optical transceiver may be provided or integrated, in one example, on a common substrate. The optical transceiver circuit may be used to demultiplex various phase shift keying optical signals, such as quadrature phase-shift keying (QPSK), polarization quadrature phase-shift keying, or polarization multiplexed phase-shift keying signals.

The following description is set forth for purpose of explanation in order to provide an understanding of the invention. However, it is apparent that one skilled in the art will recognize that embodiments of the present invention, some of which are described below, may be incorporated into a number of different systems and devices.

The embodiments of the present invention may include certain aspects each of which may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

While various portions of the present invention are described relative to specific structures with respect to a photonic integrated circuit using specific labels, such a "transmitter" or "receiver", these labels are not meant to be limiting.

Reference will now be made in detail to the present exemplary embodiments, which are illustrated in the accompanying drawings.

FIG. 1 illustrates a block diagram of an optical transceiver circuit 100 consistent with the present disclosure. Optical transceiver circuit 100 includes a transmitter 110 and a receiver 120 provided on the same substrate 102. As is discussed in detail below, the transmitter 110 includes a laser providing an optical signal which is used to transmit data, as part of an WDM optical output 140 of the transceiver circuit 100 for example. Transceiver circuit 100 also receives a WDM optical input 150 for processing in order to demodulate the optical signals encoded therein. As part of this demodulation process, as discussed in greater detail below, the optical signal originating from the laser in the transmitter may be provided to the receiver 120 over path or waveguide 130. The photonic integrated circuit comprising transceiver 100, and other photonic integrated circuits or elements thereof described herein, can be fabricated in any suitable manner know in the art and consistent with the discussion herein. Such fabrication details, for example, can be found in U.S. Pat. Nos. 7,283,694, 7,116,881, and 7,162,113, all of which are incorporated by reference herein in their entirety.

With reference to FIG. 2A, a block diagram of a first portion 200 of the optical transceiver 100 is illustrated. Transmitter 110 may include a number n of signal channels, collectively referred to as signal channels 204, and a multiplexer circuit 206. Multiplexer circuit 206 may include first and second optical multiplexers 240-1, 240-2, a polarization rotator 250, and a polarization beam combiner 260. A first signal channel 204-1 may include a laser 210-1, an optical coupler 204-1 and an optical modulator 230-1. The laser 210-1 may be any suitable laser, such as a distributed feedback (DFB) laser or a distributed Bragg reflector (DBR) laser for example. A heater 210H may be positioned adjacent each laser 210, such as a heater 210H-1 in thermal contact with laser 210-1, to set the wavelength of the corresponding first and second optical signals. The heater 210H-1 can be controlled as discussed below with reference to FIG. 8.

The optical coupler 220-1, as with other optical couplers discussed here, may be any suitable optical coupler as know in the art, each designed to accept and optical input and split the optical input into two or more optical outputs. A first optical signal is provided by the laser 210-1 to the optical coupler 220-1 on waveguide 212-1. The optical coupler 220-1 splits the optical signal 212-1 into a first optical signal provided on waveguide 214-1 as an input to the modulator 230-1 and a second optical signal provided on waveguide 130-1A to the receiver 120. As noted above, the second optical signal is provided to the receiver 120 to assist in demodulation of a received phase-shift keying (PSK) signal discussed in detail below.

The optical power utilized in the demodulation of a received PSK signal by the receiver 120 is usually less than what is required for transmission. Accordingly, the second optical signal of coupler 220-1 provided on waveguide 130-1A may, for illustration purposes only, have a power of about one-tenth of the total optical power of the input optical signal 212-1, the remaining power, less any losses in the optical coupler 220-1, would be provided in the first optical signal of coupler 220-1 provided on waveguide 214-1.

In order to compensate for this power loss to the optical signal provided on waveguide 214-1 an amplitude varying element (AVE) 216-1A, in the form of an electro-optic element for example, may be optionally provided (as shown in dashed-line) to amplify the optical signal 212-1 prior to entry into the optical coupler 220-1. Alternatively, the AVE 216-1A may provide attenuation, despite ample power available in the optical signal 212-1, in order to provide power equalization across each of the optical outputs associated with each of the signal channels 204. It should be noted that power equalization does not necessary mean to provide equal power across all the optical channels 204, but rather to provide a desired power across the optical channels 204 in order to achieve proper channel power leveling, or otherwise to meet other requires of the communication system 100 or receiver 120 portion of the communication system 100 for example. Additionally, if desired, multiple such AVEs (not shown) may be included in series with AVE 216-A for attenuation, amplification, or both, of the optical signal 212-1, as desired. Each of the one or more AVEs of each signal channel, collectively referred to as AVEs 216, may include a variable optical attenuator (VOA), a semiconductor optical amplifier (SOA), or a reversed-biased photodiode, or a combination thereof, for example. More information regarding amplitude varying elements and integrated of such elements within photonic integrated circuits may be found in U.S. Pat. No. 7,162,113, which is incorporated by reference herein in its entirety.

The modulator 230-1 receives the optical signal provided on waveguide 214-1 and provides first and second modulated outputs on waveguides 234-1A and 234-1B, respectively, each carrying a bit pattern to be transmitted over a network infrastructure, in the form of a PM DQPSK signal for example. The first modulated output on waveguide 234-1A is provided to the first multiplexer 240-1 and the second modulated output on waveguide 234-1B is provided to the second multiplexer 240-2.

Since the laser 210-1 may have a first end and a second end, each of which may emit an optical signal, the optical signal provided waveguide 130-1B, as depicted in dashed line, may be optionally provided to the transmitter 120 in lieu of optical signal on waveguide 130-1A. As should be obvious, if optical signal on waveguide 130-1B is provided, AVE 216-1 and optical coupler 220-1 may no longer be needed in connection with the demodulation process in receiver 120, however may be desirable for other purposes. For example, the optical signal provided on waveguide 130-1A may be used to provide feedback to a control system (not shown) for maintaining desired operating characteristics of the laser 210-1, such as optical power and wavelength control for example. Alternatively, in the case where optical signal on waveguide 130-1A is provided to the receiver 120 for utilization in the demodulation process, the optical signal on waveguide 130-1B may be provided to the control system for maintaining the desired operating characteristics of the laser 210-1, as discussed in greater detail below.

Each of the signal channels 204 provided on substrate 202 may be configured in a similar manner as signal channel 204-1, thus provided corresponding first modulated outputs, collectively referred to as modulated outputs 234A, to the first optical multiplexer 240-1 and second modulated outputs, collectively referred to as modulated outputs 234B, to the second optical multiplexer 240-1. Alternatively, each one of the signal channels 204 may be configured differently. For example, one or more of the signal channels 204 may include a different number of AVEs 216, or may provide an alternative source for the optical signal 130, e.g. providing the optical signal on waveguide 130-1B in lieu of the optical signal on waveguide 130-1A to the receiver 120 on a per channel 204 basis. Alternatively, one or more of the signal channels 204 may provide an optical signal on waveguide 130-1B in addition to optical signal on waveguide 130-1A, one of the optical signals provided for maintenance of the laser 210-1 for example, and the other optical signal provided to the receiver 120 for demodulation of an incoming PSK signal, for example, as discussed below.

Multiplexers 240-1, 240-2 multiplex the received modulated inputs received on waveguides 234 into a multiplexed output signal for transport on waveguides 242-1, 242-2A, respectively. Light pulses have primary and orthogonal polarization states or modes referred to as the Transverse Electric (TE) and Transverse Magnetic (TM) modes. The TM component may be thought of as propagating perpendicular to an axis of the optical waveguide and the TE polarization mode may be thought of as propagating parallel to the axis of the optical waveguide. Each of the multiplexed outputs on waveguides 242-1, 242-2A are transmitted with respect to the same polarization, for example a TE polarization, a first TE polarized output signal provided on waveguide 242-1 and a second TE polarized output signal provided on waveguide 242-2A for example. Thus, prior to being combined in the polarization beam combiner 260, the second TE polarized output signal on waveguide 242-2A is rotated 90 degrees in rotator 250 to become a first TM polarized output signal. The first TE polarized output signal on waveguide 242-1 is provided to a first input of the polarization beam combiner 260 and the first TM polarized output signal on waveguide 242-2B is provided to a second input of the polarization beam combiner 260. The polarization beam combiner 260 combines the received signals and provides a combined output signal, in the form of a PM DQPSK signal for example, on an output waveguide 140 for transmission out of the transceiver photonic integrated circuit 100. Preferably, each of the optical signals in the first TE polarized output signal has a corresponding one of a plurality of wavelengths ($\lambda 1$ to $\lambda n$), and each of the optical signals in the first TM polarized output signal has a corresponding one of the plurality of wavelengths ($\lambda 1$ to $\lambda n$). As is know in the art, the combined output signal may exit the transceiver photonic integrated circuit 100 via a facet 203 for example.

Although FIG. 2A illustrates multiplexer circuit 206 provided on the same substrate 202 as, for example, the signal channels 202, as well as the receiver 120, it is understood that all or a portion of multiplexer circuit 206 may be provided on a separate substrate from substrate 202. In that case, polarization maintaining fibers may be used to supply the modulated optical signals on waveguides 234 to the first and second multiplexers 240-1, 240-2.

Figure 2B:
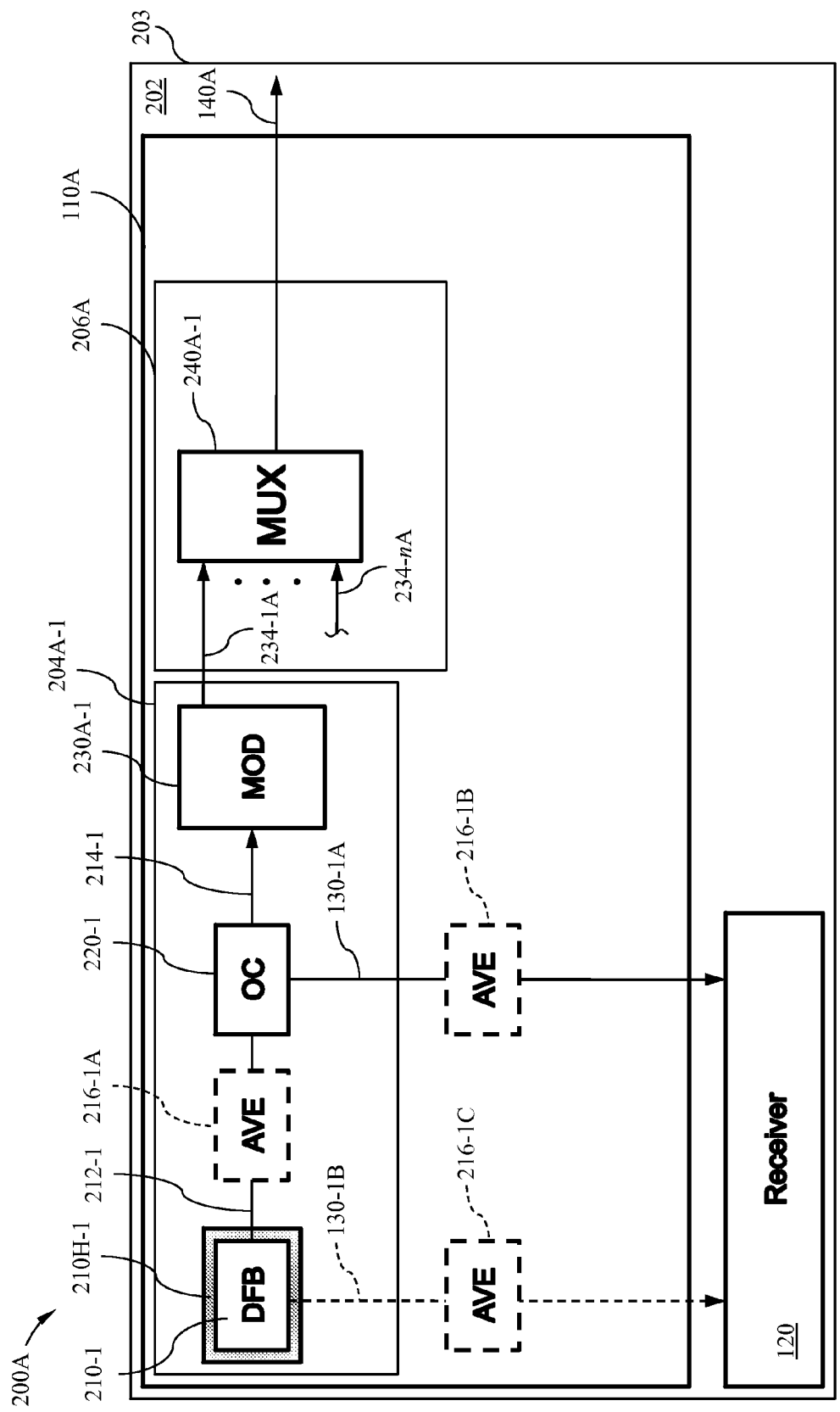
FIG. 2B is a block diagram of an alternative first portion of the optical transceiver of FIG. 1 consistent with various aspects of the present disclosure.

It is noted that although transmitter 110 of FIG. 2A have been described in terms of a polarization multiplexed signal, the present invention is not dependent on utilization of such polarization multiplexed signals. For example, with reference to FIG. 2B, the transmitter 110A may employ a phase-shift keying format, such as quadrature phase-shift keying (QPSK), where the data is not also encoded with respect to the polarization of the associated optical signal. In such systems, therefore, the data may be encoded on a single modulated output, for example on the first of the two outputs of the modulator 230-1 of transmitter 110 or on a modulator 230A-1 designed to provided a signal phase-shift keying modulated output for example. The single output from the modulator 230A-1 of signal channel 204A-1 is then provided to a single multiplexer 240A-1, similar to multiplexer 240-1 for example, the multiplexed output of the multiplexer 240A-1 provided on a waveguide 140, as an output from the transmitter 110A.

FIG. 3 illustrates an exemplary modulator or modulator system 230-1 of the transmitter 100, the modulators of all the signal channels 204 collectively referred to as modulators 230, in accordance with various aspects of the present disclosure. Modulator system 230-1 may be utilized to encode data in a PM DQPSK format, for example. With respect to signal channel 202-1, modulator system 230-1 receives the optical signal on waveguide 214-1 which originated from laser 210-1, and modulates the received optical signal through the use of a plurality of modulators 232, which collectively may constitute a "modulator", hence the reference modulator system 230-1. As is discussed in greater detail below, a first pair of the plurality of modulators 232-1, 232-2 provides the first modulated output signal waveguide 234-1A along an optical path as generally indicated by arrow 233-1. In a similar fashion, a second pair of the plurality of modulators 232-3, 232-4 provides the second modulated output signal waveguide 234-1B along an optical path as generally indicated by arrow 233-2.

With reference to optical path 233-1, optical path 233-1 includes a series of interconnected optical couplers, denoted $C_1$, $C_{2-1}$, and $C_{3-1}$, as well as the pair of modulators 232-1, 232-2. The optical signal on waveguide 214-1 is coupled to the modulator 230-1 via the optical coupler $C_1$, a first portion, 50% for example, of the received optical signal propagates along the optical path generally indicated by arrow 233-1, and a second portion of the received optical signal propagates along the optical path generally indicated by arrow 233-2. Following the optical path generally defined by arrow 233-1, the propagating optical signal is then split in the optical beam splitter or coupler $C_{2-1}$, a portion of the optical signal directed to the modulator 232-1, and a portion of the optical signal directed to modulator 232-2.

Each optical modulators 232-1 and 232-2 is preferably a Mach-Zehnder optical modulator and includes first and second optical couplers $C_{M1}$, $C_{M2}$ and first and second arms $A_{M1}$, $A_{M2}$, as shown with respect to modulator 232-1. The propagating optical signal received from the splitter $C_{2-1}$ is coupled to each of the first and second arms $A_{M1}$, $A_{M2}$ by the first coupler $C_{M1}$. As is know in the art, through application of an electric field along one of the arms, arm $A_{M1}$ for example, the optical signals interfere constructively or destructively at the second combiner $C_{M2}$, thus allowing the optical signal to pass or be effectively blocked, respectively. A changing electric field along the arm $A_{M1}$ corresponds to a desired data bit pattern encoded by the modulator 232-1. The output of the modulator 232-1 and the output of the modulator 232-2 are coupled into the modulated output optical signal provided on waveguide 234-1A by an optical coupler $C_{3-1}$, then provided to further structures as defined and described herein. Modulators 232-3 and 232-4 are constructed in similar fashion as modulators 232-1 and 232-2, described above, providing the modulated output optical signal on waveguide 234-1B via the optical coupler $C_{3-2}$. Modulators 232-1 to 232-4 may be operated in a known manner to output an optical signal that is modulated in a desired format, in accordance with a PM DQPSK format for example. Thus, the optical modulator or modulator system 130-1 accepts an optical input on an input waveguide 214-1 and provides two modulated output signals on corresponding waveguides 234-1A, 234-1B, each carrying first and second bit patterns, respectively. Preferably, modulator 130-1 is one of a plurality of such modulators 130 that may be provided on the photonic integrated circuit (PIC), one for each signal channel 204 for example, and each such modulators 130 supplying corresponding pairs of bit patterns, later combined in the multiplexer circuit 206 for transmission from the photonic integrated circuit 100. An exemplary modulator system is described in greater detail in U.S. patent application Ser. No. 12/345,315, filed Dec. 29, 2008, entitled "HIGH CAPACITY TRANSMITTER IMPLEMENTED ON A PHOTONIC INTEGRATED CIRCUIT", incorporated by reference herein in its entirety.

It is noted that the optical couplers $C_1$, $C_{2-1}$, and $C_{3-1}$ utilized in modulator 130-1 may be part of other systems, as part of the photonic integrated circuit 100. For example, modulator 330-1 of FIG. 3B is similar to the modulator 130-1 of FIG. 3A, however does not include optical coupler $C_1$. Rather, the optical coupler 320-1 is provided in lieu of optical coupler $C_1$, optical coupler 320-1 part of another portion of the signal channel 204-1 of photonic integrated circuit 100. Thus, the optical signal provided on waveguide 214-1 can be provided to optical coupler 320-1 which splits the optical signal into a first portion provided on waveguide 214-1A and a second portion provided on waveguide 214-1B, each provided as one or two inputs to modulator 330-1.

The receiver 120, as part of the transceiver 100, will next be described with reference to FIG. 4A. The receiver 120 includes a demultiplexer circuit 402, first and second demultiplexers 470-1, 470-2, an optical hybrid circuit 480, and a processing circuit 490 (shown with reference to FIGS. 7-10 below). The demultiplexer circuit 402 includes a polarization splitter, also referred to as a polarization beam splitter (PBS) 410. As with the PBC 260 of FIG. 2, PBS 410 may constitute a Mach-Zehnder interferometer including an input waveguide and a branch waveguide (not shown) having one or more layers of materials that preferentially affect the index of light having either a TM transverse magnetic (TM) polarization or a transverse electric (TE) polarization. Typically, a WDM signal including first and second optical signals having TE and TM polarizations, may be supplied to PBS 410 via an input waveguide 150. Those optical signals having a first polarization, e.g. a first TE polarized optical input signal, may be provided at a first port of the PBS 410 to a waveguide 412 coupled to polarizer 420, and those having a second polarization, e.g. a first TM polarized optical input signal, may be output from a second port of the PBS 410 to a waveguide 414 coupled to polarizer 430. Preferably, each of the optical input signals having the first polarization has a corresponding one of a plurality of wavelengths ($\lambda 1$ to $\lambda n$), and each of the optical signals having the second polarization has a corresponding one of the same plurality of wavelengths. The plurality of wavelengths is the same plurality of wavelengths ($\lambda 1$ to $\lambda n$) associated with the WDM signal transmitted by the transmitter 110, as discussed above.

Polarizer 420, as is know in the art, may receive the first TE polarized input optical signals, for example, and may be configured to block or filter any extraneous or residual light that does not have the TE polarization. As a result, a WDM signal including the first TE polarized input optical signals is output from polarizer 420, and provided as an input to the optical demultiplexer 470-1 on a waveguide 460. The first TM polarized input optical signals are provided to the polarizer 430, which may be configured to block or filter any extraneous or residual light that does not have the TM polarization. As a result, a WDM signal including the first TM polarized input optical signals is output from polarizer 430 and provided to an optical rotator 440. As is known in the art, the optical rotator 440 may be configured to rotate the polarization of the first TM polarized input optical signals, such that corresponding optical signals having a TE polarization is provided to a polarizer 450. The known polarizer 450 may be further provided to filter or block any extraneous or residual light output from the rotated signals provided at the output of the rotator 440 which do not have the TE polarization. The polarization rotated optical signals, or second TE optical signals are output from the polarizer 450 and provided to the second demultiplexer 470-2 on a waveguide 462.

Figure 4A:
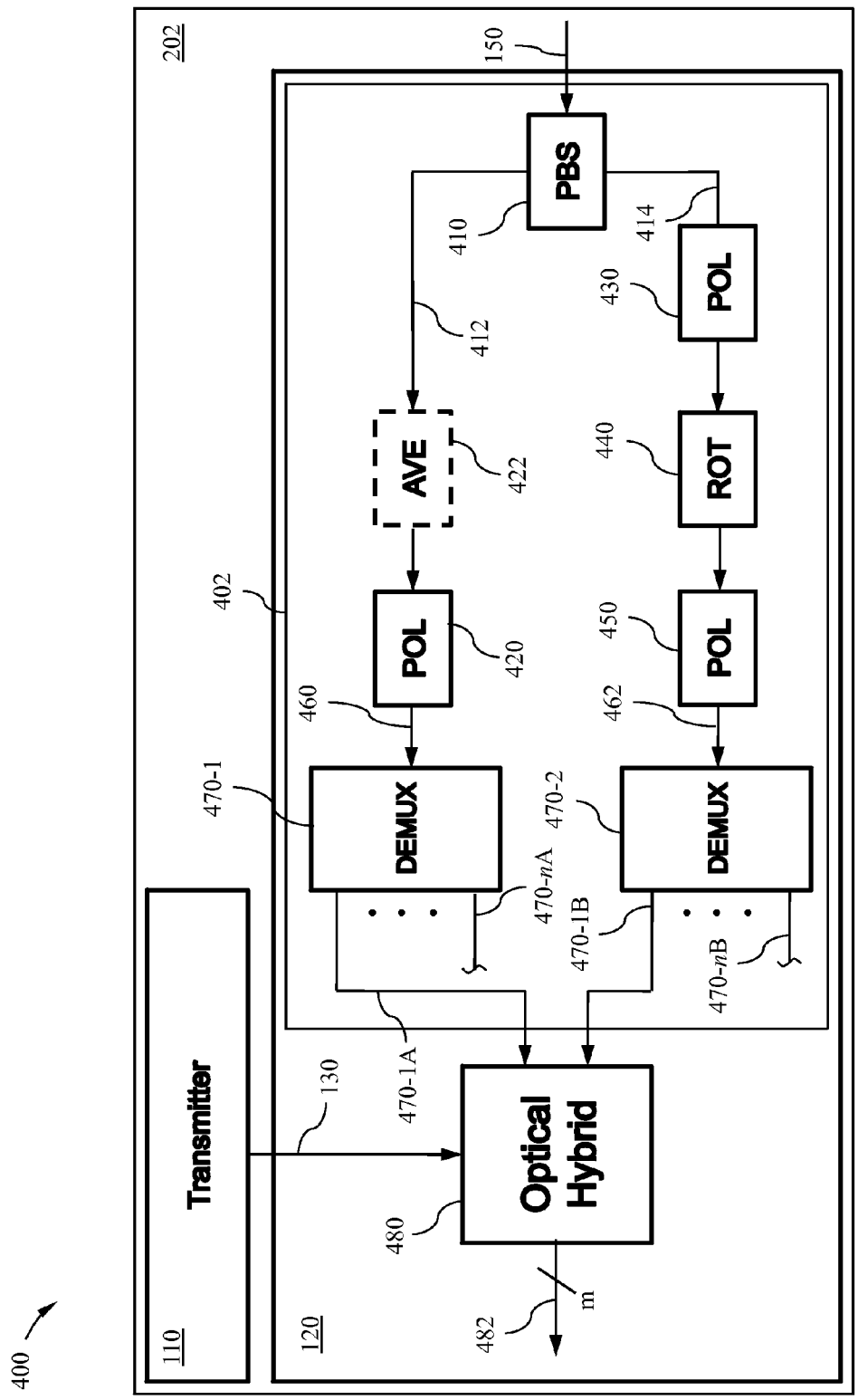
FIG. 4A is a block diagram of a second portion of the optical transceiver of FIG. 1, consistent with various aspects of the present disclosure.
Figure 4B:
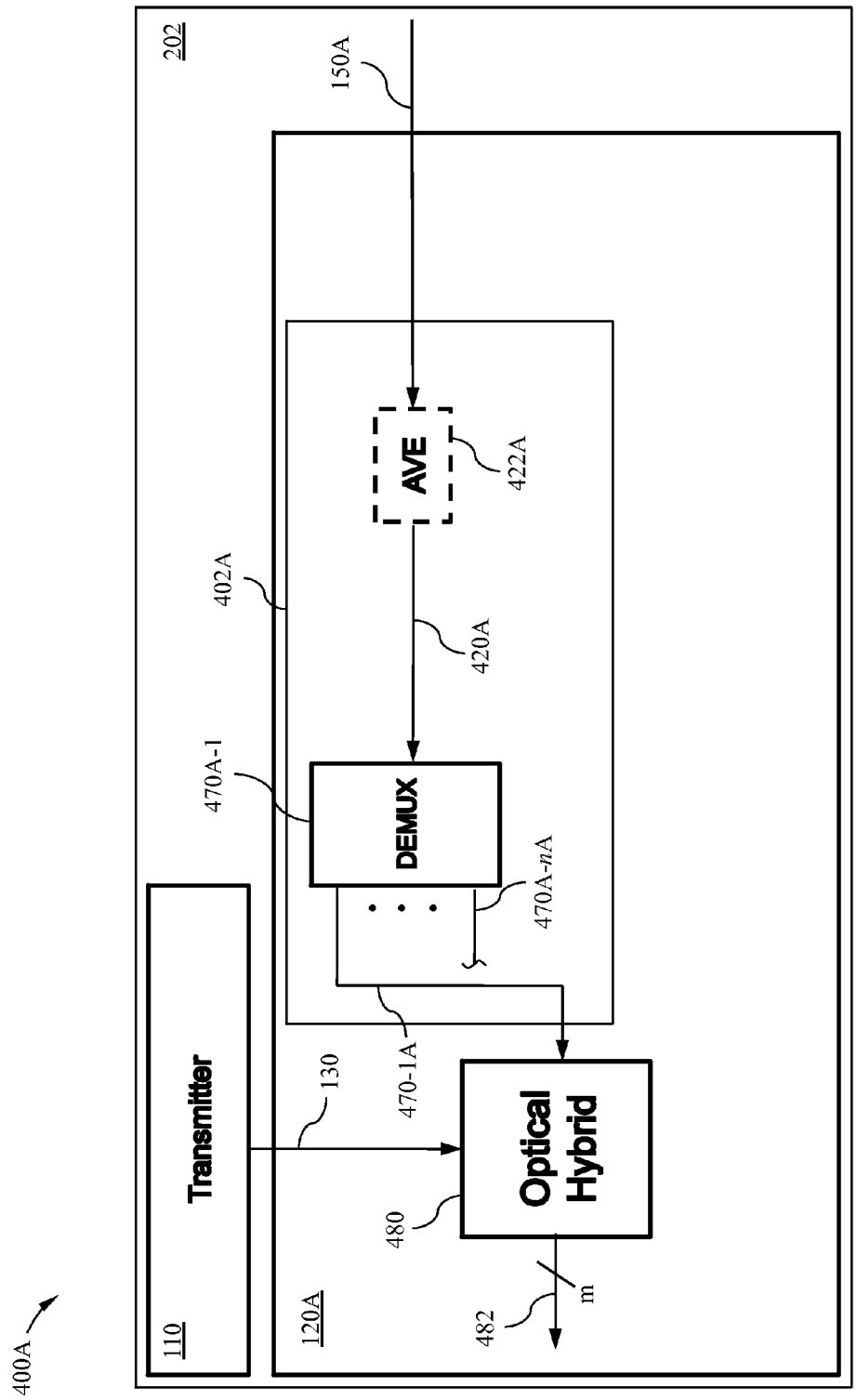
FIG. 4B is a block diagram of an alternative second portion of the optical transceiver of FIG. 1 consistent with various aspects of the present disclosure.

Although FIG. 4A illustrates demultiplexer circuit 402 provided on the same substrate 202 as, for example, the first and second demultiplexers 470-1, 470-2 and the optical hybrid circuit 480, as well as the transmitter 110, it is understood that demultiplexer circuit 402 may be provided on a separate substrate from substrate 202. In that case, polarization maintaining fibers may be used to supply first and second TE polarized optical signals 460, 462 to the first and second demultiplexers, respectively.

First and second TE polarized input signals provided on waveguides 460, 462, respectively, are provided to the first and second optical demultiplexers 470-1, 470-1, respectively, for demultiplexing into a plurality of optical signals, each having a corresponding one of the set of wavelengths $\lambda 1$-$\lambda n$. More specifically, each of the optical outputs of the first optical demultiplexer 470-1 provided on a first set of waveguides 470-1A-470-nA has a corresponding one of the plurality of wavelengths $\lambda 1$-$\lambda n$. In similar fashion, each of the optical outputs of the second optical demultiplexer 470-2 provided on a second set of waveguides 470-1B-470-nB has a corresponding one of the plurality of wavelengths $\lambda 1$-$\lambda n$. As with multiplexers 240-1, 240-2, optical demultiplexers 470-1, 470-2 may be any suitable optical demultiplexer, such as an arrayed wavelength grating (AWG) for example. The optical outputs on waveguides 470-1A, 470-1B are provided to the optical hybrid circuit 480, along with optical signals provided via waveguide 130 from the transmitter 110. For example, given that the demultiplexed optical signal on waveguide 470-1A has a wavelength of $\lambda 1$, as well as demultiplexed optical signal on waveguide 470-1B, the corresponding optical signal having a wavelength of $\lambda 1$ provided from one of the lasers 210 along waveguide 130 is provided to the optical hybrid circuit 480. In response to the received demodulated optical signals on waveguides 470-1A and 470-1B, and the optical signal from one of the lasers 210, the optical hybrid circuit provides m optical signals for processing into the electrical domain, as discussed in greater detail below. In a similar fashion, each of the remaining demodulated optical signals, e.g. optical signals provided by the demultiplexers 470 on waveguides 470-1A through 470-nA and on waveguides 470-1A through 470-nB, are provided to optical hybrid circuit 480.

As noted above, transmitter 110 of FIG. 2A is not dependent on utilization of such polarization multiplexed signals. With reference to portion 400A of FIG. 4A, if a transmitter 110A is alternatively used as discussed above, a corresponding exemplary receiver 120A may also be used. Receiver 120A is similar to receiver 120, however includes a demultiplexer circuit 402A in place of demultiplexer circuit 402. The demultiplexer circuit 402A may accept a multiplexed optical signal on waveguide 150A similar to waveguide 150, from a facet 203 for example. The received multiplexed optical signal may be amplified or attenuated via an AVE 422A, similar to AVE 422, prior to being provided to a demultiplexer 470A on a waveguide 420A. Demultiplexer 470A may be similar in construction to demultiplexer 470. A first of a plurality of outputs is provided to optical hybrid circuit 480 on a first waveguide 470-1A, and processed in a similar manner as described below for example.

Figure 5A:
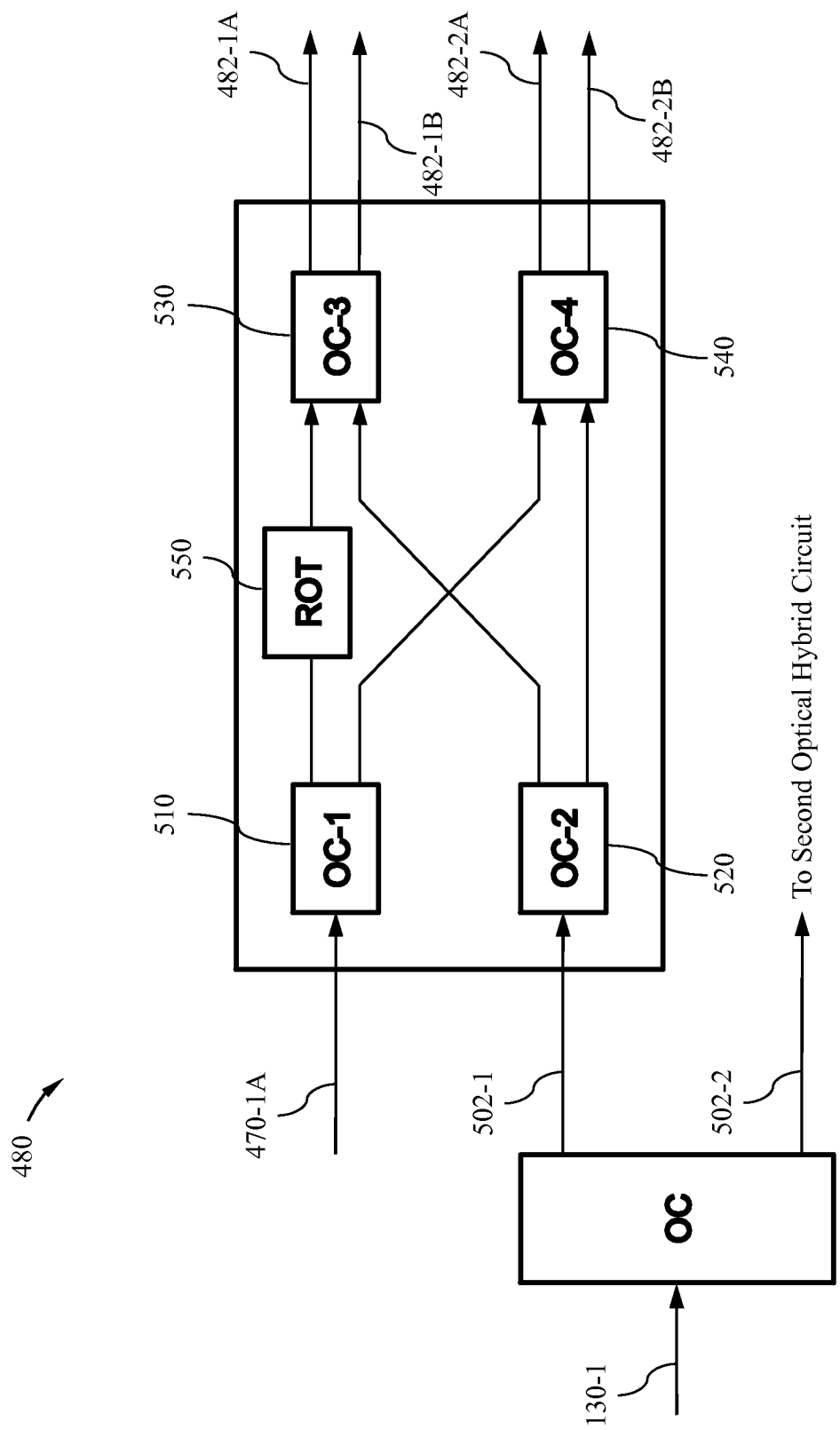
FIG. 5A is a block diagram of an exemplary optical hybrid circuit, consistent with various aspects of the present disclosure.

With reference to FIG. 5A, an exemplary optical hybrid circuit 480 in accordance with various embodiments of the present disclosure will be discussed. Each optical hybrid circuit 480 combines a received optical signal, having a respective one of the plurality of wavelengths $\lambda 1$-$\lambda n$ with a local oscillator or reference optical signal, provided on the waveguide 130 for example, to form new optical signals which can then be processed in order to retrieve the encoded data within the received optical signal. Since there are two optical signals received with respect to each lambda or wavelength, as part of the plurality of wavelengths $\lambda 1$-$\lambda n$, two such optical hybrid circuits 480 may be used per wavelength. Thus, a local oscillator or reference optical signal having a single wavelength and provided on waveguide 130-1 is provided to an optical coupler 520 which splits the optical signal into a first portion provided to the optical hybrid circuit 480 on a waveguide 502-1, and a second portion provided to a second optical hybrid circuit 480 (not shown, but similar in construction as the first optical hybrid circuit 480) on a waveguide 502-2.

The optical hybrid circuit 480 includes a number of optical couplers 510, 520, 530, 540 and a phase shifter 550. The optical hybrid circuit 480 accepts the received demultiplexed optical signal having a wavelength $\lambda 1$, corresponding to received channel signal 1 for example, on waveguide 470-1A. The optical signal from signal channel 1 of the transmitter 110 having a wavelength $\lambda 1$, e.g. the optical signal from laser 210-1 as part of signal channel 204-1, is provided on waveguide 502-1 as discussed above. Each of the input optical signals 470-1A, 130-1 provided to an optical hybrid circuit, such as optical hybrid circuit 480, have similar polarizations, for example, they are both TE polarized signals. The received optical signal supplied by waveguide 470-1A is provided to optical coupler 510 which splits the optical signal, providing a first portion to phase shifter 550 and a second portion to optical coupler 540. The phase shifter 550 shifts the phase of the received optical signal, for example by $\pi/2$, prior to passing the phase shifted, or otherwise delayed, signal on to optical coupler 530. The received optical signal supplied by waveguide 502-1 is provided to optical coupler 520 which splits the signal to provide a first portion to optical coupler 530 and a second portion to optical coupler 540. Optical coupler 530 combines the phase-shifted optical signal received from the phase shifter 550 with the first portion of the split reference optical signal received on waveguide 502-1 and provides the combined optical signal on first and second waveguides 482-1A, 482-1B, collectively referred to as waveguides 482-1. In a similar fashion, optical coupler 540 combines the optical signal received from the optical coupler 510 and the optical signal received from the optical coupler 520 to provide a second combined optical output on waveguides 482-2A, 482-2B, collectively referred to as waveguides 482-2. The optical outputs on the four output waveguides 482-1, 482-2 are then further processed to extract the data encoded within the optical signal provided to the optical hybrid circuit 480 on waveguide 470-1A. For example, with reference to the processing circuit 600 of FIG. 6, the optical outputs on the four output waveguides 482-1, 482-2 may be processed to extract first in-phase (I) and quadrature (Q) signals associated with demodulation of a phase-shift keying signal. The first pair of optical signals on waveguides 482 are provided to a first pair of photodiodes, for example PIN photodiodes, which are biased by a first voltage V1 and a second voltage V2. The photodiode pair PD-1A, PD-2A are coupled to a trans-impedance amplifier (TIA), the output of the TIA resulting in one of the first I and Q, for example the quadrature signal. In similar fashion, the other of the first I and Q, for example the in-phase signal, is obtained.

A similar, e.g. a second, optical hybrid circuit 480 may be utilized for the optical signal received along waveguide 470-1B to generate corresponding second in-phase (I) and quadrature (Q) signals. Additionally, similar optical hybrid circuits 480 can be utilized for the remaining optical signals received along waveguides 470-2A through 470-nA, representing the remainder of the first TE polarized input signals, and waveguides 470-2B through 470-nB, representing the second TE polarized input signals. Optionally, with reference to FIG. 5B, the optical hybrid circuit 480 may include a multi-mode interference (MMI) coupler 480M. The MMI coupler 480M accepts optical signals on waveguides 470-1A and 502-1 and provides optical outputs 482-1A, 482-1B, 482-2A, 482-2B, the outputs of the MMI coupler 480M being fed to photodiode pairs PD-1A, PD-2A for example, in a manner similar to that discussed above. For more information regarding the optical hybrid circuit 480, see U.S. patent application Ser. No. 12/572,179, incorporated herein by reference in its entirety.

Thus, as described, the transceiver photonic integrated circuit 100 allows for the optical signal from a laser located in the transmitter section 110 of the circuit 100 to be shared with the receiver section 120 of the circuit 100 allowing for a more compact design. A more efficient design is also realized since discrete transmitters and receivers which transmit and receive PM DQPSK signals would either require a local oscillator in the receiver or the transmission of additional signals from the transmitter to the receiver in order to process the received PM DQPSK signals, each alternative requiring additional elements which would require additional power.

Figure 7:
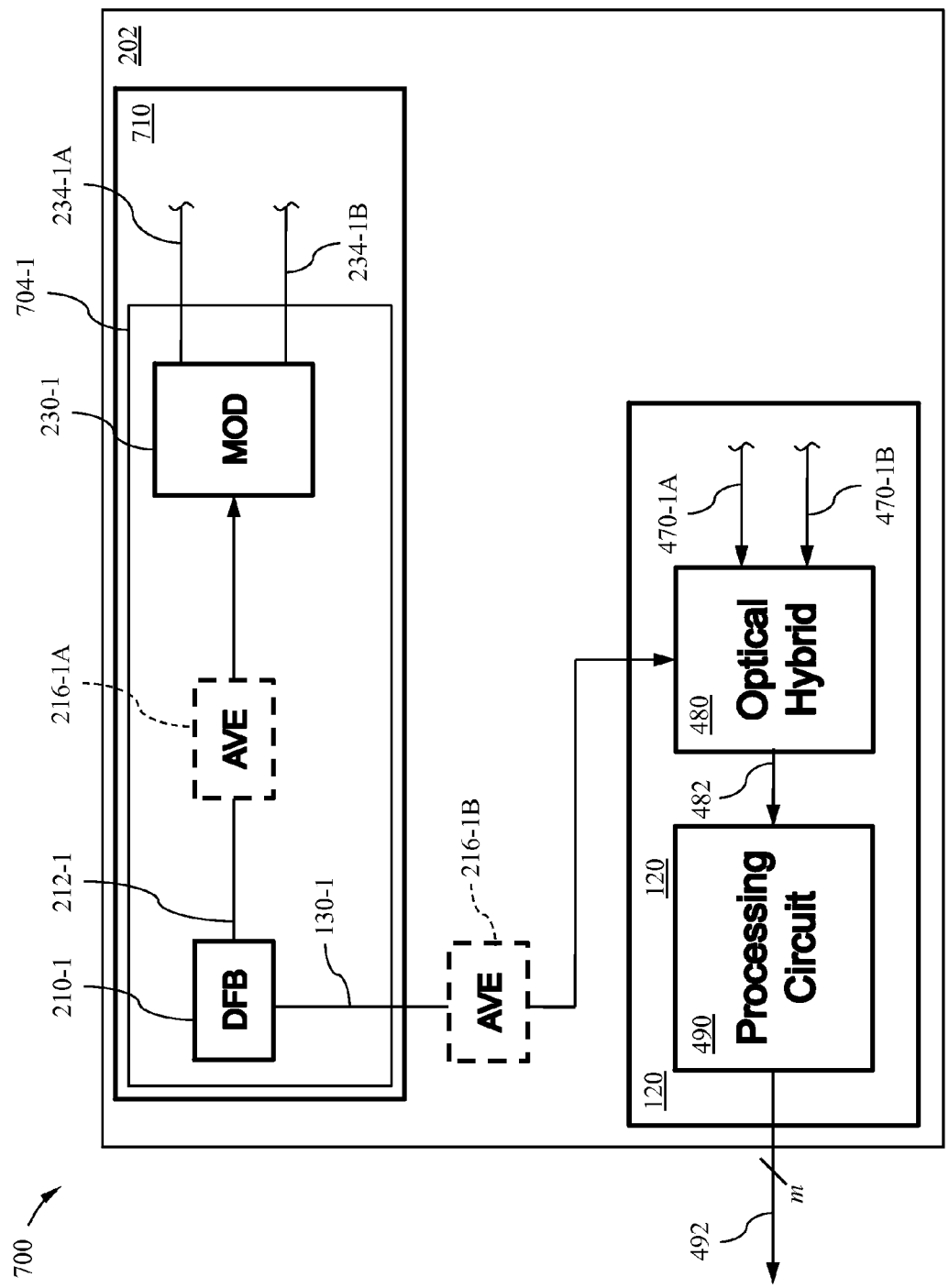
FIG. 7 is a block diagram detailing an exemplary configuration of an optical transceiver, consistent with various aspects of the present disclosure.

Turning to FIG. 7, a block diagram detailing another exemplary configuration 700 of an optical transceiver 100, consistent with various aspects of the present disclosure, will be discussed. Optical transceiver 700 includes a transmitter 710, which is similar to transmitter 110, however the second output of the laser 210-1 is provided to the optical hybrid circuit 480 on the waveguide 130-1 for the purposes of demodulating incoming demultiplexed polarized signals. As such, optical coupler is not necessarily needed and, thus, the optical signal of the first output of the laser 210-1 is provided directly to the modulator, e.g. modulator 230-1, on waveguide 212-1. As discussed above, one or more AVEs 216 can optionally be provided to amplify, attenuate, or amplify and attenuate corresponding optical signals on waveguides 212-1 and 130-1.

FIG. 7 also depicts processing circuit 490 which, for example, may include the processing circuit 600 of FIG. 6. The processing circuit 490 accepts the various optical outputs 482 from the optical hybrid circuit 480 and processes the optical signals into corresponding electrical signals, for example a plurality of outputs, each of the plurality of outputs including a corresponding in-phase and quadrature signal. With n signal channels, the processing circuit may provide 8 n outputs on an output 492 which, in turn, can be further processed to extract the data encoded therein.

Figure 8:
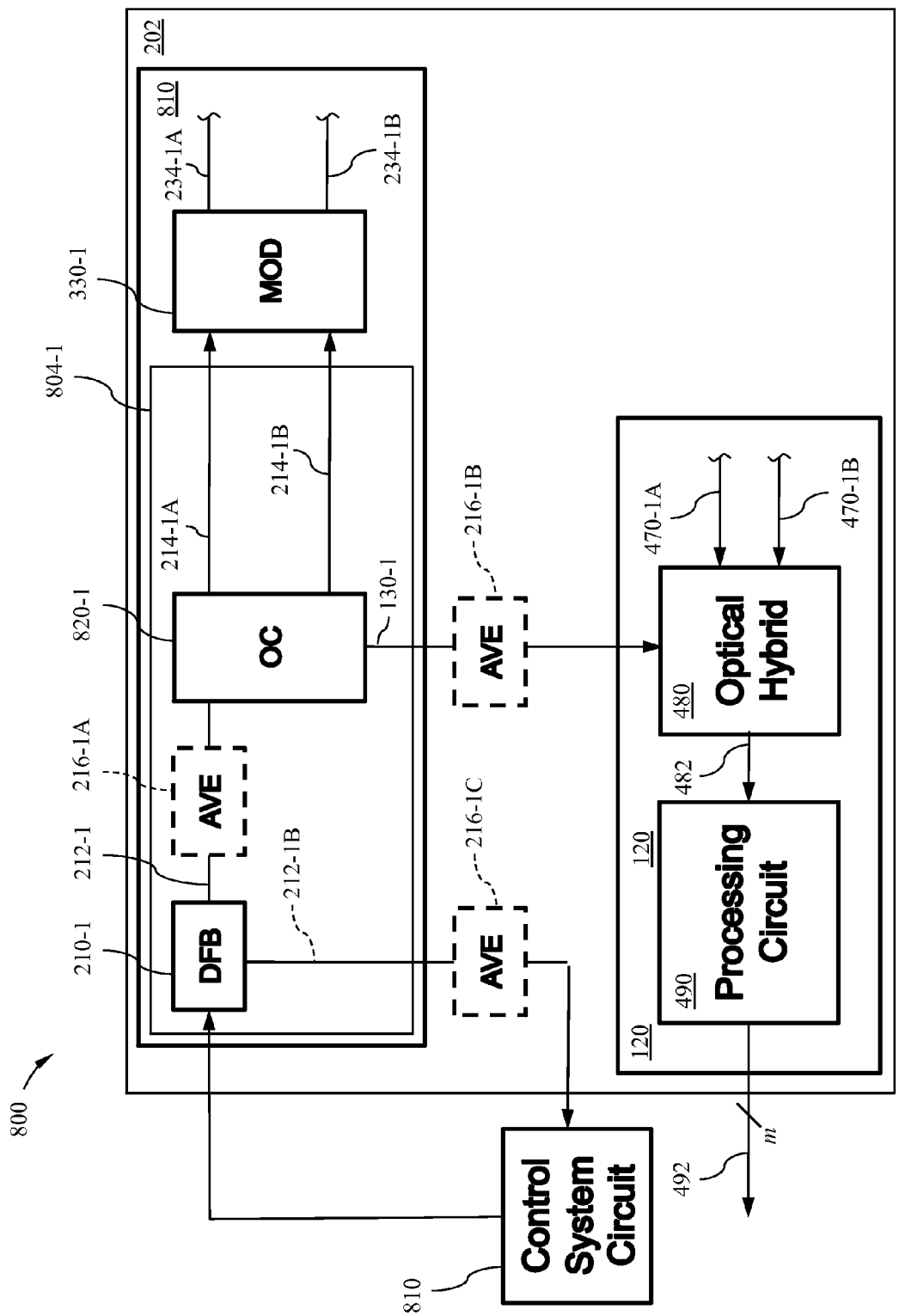
FIG. 8 is a block diagram detailing another exemplary configuration of an optical transceiver, consistent with various aspects of the present disclosure.

Turning to FIG. 8, a block diagram detailing still another exemplary configuration 800 of an optical transceiver 100, consistent with various aspects of the present disclosure, will now be discussed. Transceiver 800 includes a transmitter 810 similar to transmitter 110, however includes an optical coupler 820-1 in place of optical coupler 220-1. Optical coupler 820-1 accepts the first output optical signal from the laser 210-1 on waveguide 212-1 and splits the first output optical signal into three portions. First and second portions carry the majority of the optical energy compared to the third portion. For example, the third portion may be about 10% of the optical energy of the first output optical signal received from the laser 210-1. First and second portions are provided on waveguides 214-1A, 214-1B, respectively, provides first and second inputs to modulator 330-1, for example modulator 330-1 of FIG. 3B. A third portion of the first output optical signal is provided to the optical hybrid circuit 480 along waveguide 130-1 to be utilized in the demodulation process of the signals received by the hybrid circuit 480 on waveguides 470. As shown in dashed-line, one or more optional AVEs 216-1A can be provided to amplify, attenuate, or amplify and attenuate the first output optical signal prior to passing the signal on to the coupler 820-1. Also, one or more optional AVEs 216-1B can be provided to accept the third portion of the first output optical signal from the coupler 820-1 to amplify, attenuate, or amplify and attenuate the optical signal prior to passing it on to the optical hybrid circuit 480.

Also shown in FIG. 8, the second output of the laser 210-1 may be provided to a control system circuit 812 for further analysis in order to maintain the characteristics of the laser 210-1, such as the power and wavelength of the first output of the laser 210-1. Feedback can be provided to the laser 210-1 via the communication path 812. Such feedback may be signals related to the drive current of the laser 210-1, to maintain a desired power level at the first output for example. Alternatively, the feedback may include commands to the heater, such as heater 210H-1 of FIG. 2, to maintain the wavelength of the first optical output of the laser 210-1 at a desired value. For more information regarding maintaining the desired operating characteristics of a laser, as part of a photonic integrated circuit for example, see U.S. Pat. No. 7,680,364 and U.S. patent application Ser. No. 12/409,067, both of which are incorporated by reference in their entirety.

Figure 9:
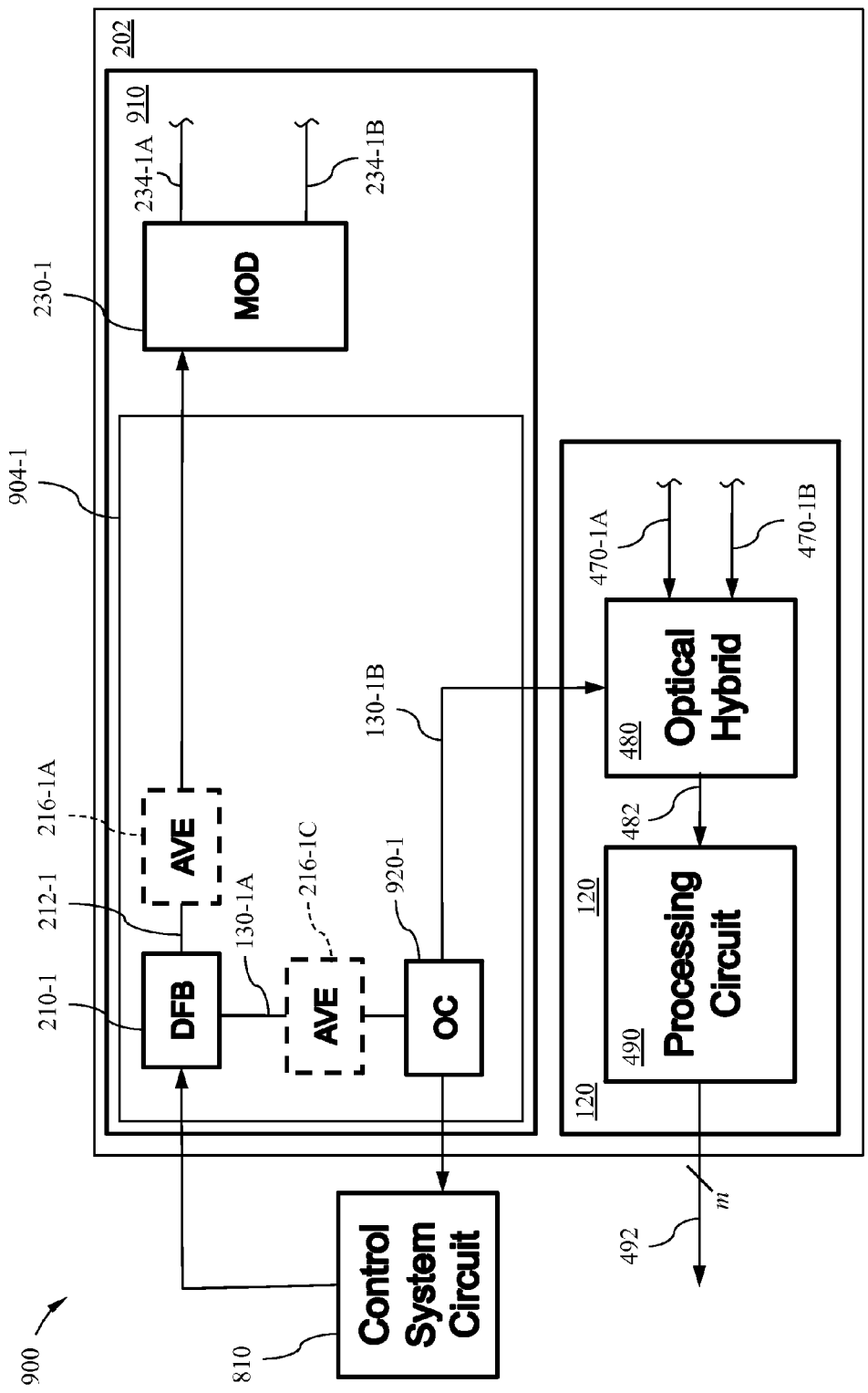
FIG. 9 is a block diagram detailing yet another exemplary configuration of an optical transceiver, consistent with various aspects of the present disclosure.

Turning to FIG. 9, a block diagram detailing another exemplary configuration 900 of an optical transceiver 100, consistent with various aspects of the present disclosure, will now be discussed. Transceiver 900 includes a transmitter 910 similar to transmitter 110, however does not include an optical coupler 220-1. Rather, the first optical signal from laser 210-1 is provided directed to the modulator 230-1 on waveguide 212-1, via an optional AVE 216-1A as discussed above. Transmitter 910 includes an optical coupler 920-1 which accepts the second optical signal output from the laser 210-1 on waveguide 130-1A and splits the optical signals into two portions. A first portion is provided to a control system, such as control system circuit 812 of FIG. 8, providing a signal necessary for proper feedback with the laser 210-1 to control the power and wavelength of the first output optical signal. A second portion is provided to the optical hybrid circuit 480 via waveguide 130-1B. The transmitter 910 may optionally include an AVE 216-1C positioned between the laser 210-1 and the optical coupler 920-1 to amplify, attenuate, or amplify and attenuate the second output optical signal as necessary to maintain desired output levels of the first and second portions provided as outputs from the coupler 920-1.

Figure 10:
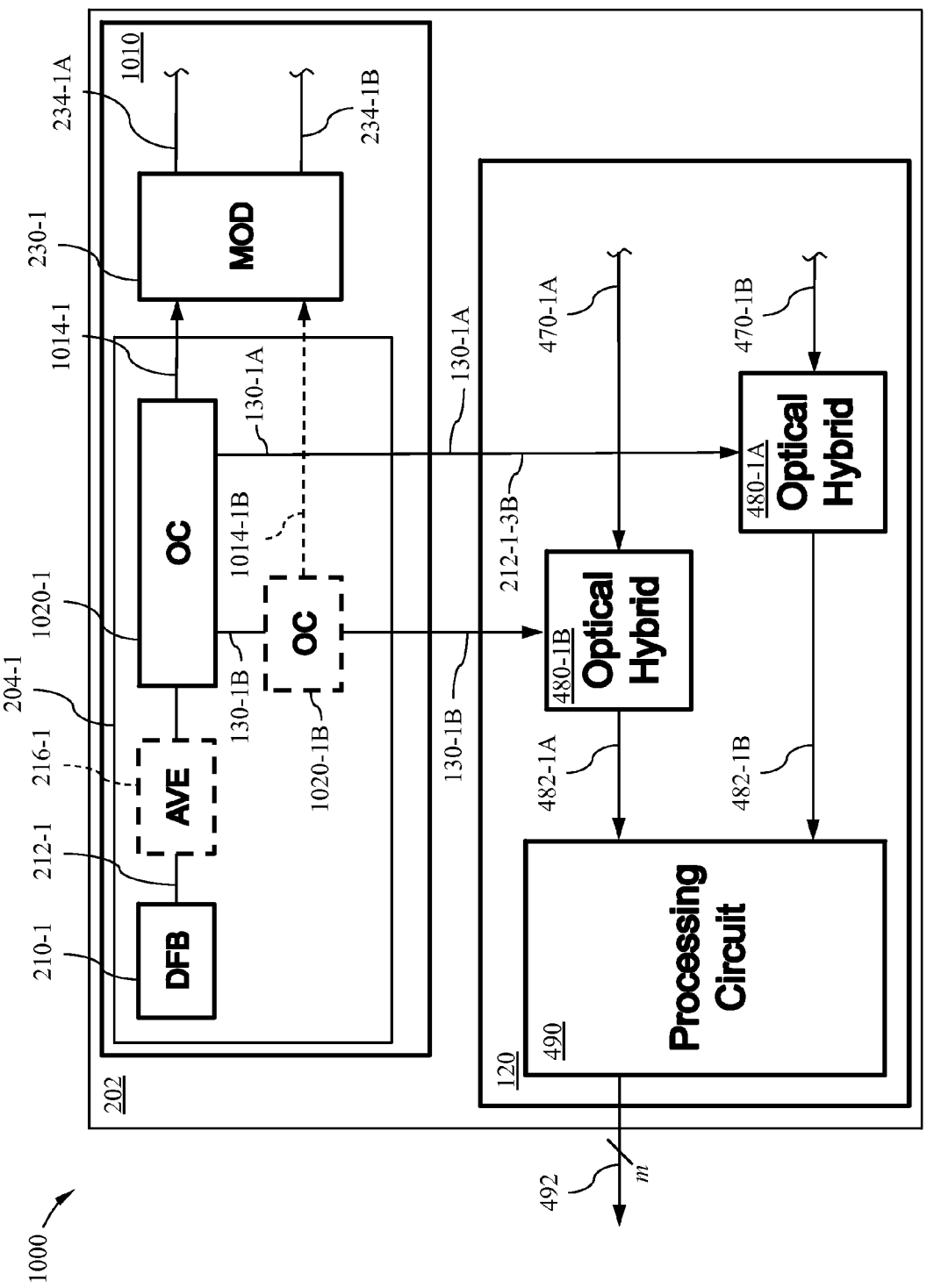
FIG. 10 is a block diagram detailing still another exemplary configuration of an optical transceiver, consistent with various aspects of the present disclosure.

Turning to FIG. 10, a block diagram detailing another exemplary configuration 1000 of an optical transceiver 100, consistent with various aspects of the present disclosure, will be discussed. Optical transceiver 1000 includes a transmitter 1010, which is similar to transmitter 110, however a coupler 1020-1 is provided instead of coupler 220-1. Optical coupler 1020-1, similar to the optical coupler 820-1 of FIG. 8, accepts the first output optical signal of the laser 210-1, via one or more AVEs 216-1 as discussed above, on waveguide 212-1 and splits the optical signal into three portions. The first portion is provided to modulator 230-1 via waveguide 1014-1, and the second and third portions are provided to first and second optical hybrid circuit 480-1A, 480-1B, each similar to optical hybrid circuit 480, via waveguides 130-1A, 130-1B, respectively. As shown in dashed-line, the transmitter 1010 may optional include optical coupler 1020-1B which would split the third optical portion from coupler 1020-1 on waveguide 130-1B into a first portion supplied to the modulator 230-1 on waveguides 1014-1B and a second portion supplied to the second optical hybrid circuit 480-1B on waveguide 130-1B. If optional coupler 1020-1B is utilized then the modulator 230-1 would be configured like modulator 330-1 of FIG. 3B. More specifically, the initial coupler $C_1$ of modulator 230-1 of the FIG. 2 embodiment would not be necessary since the modulator is provided with two input signals, a first on waveguide 1014-1 and a second on waveguides 1014-1B. One or more AVEs may be positioned to receive each of the first, second, and third optical signal portions from the coupler 1020-1 output to amplify, attenuate, or amplify and attenuate the corresponding optical signal portions prior to delivery to their final destinations.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A transceiver having an input and an output, comprising:
a substrate;
a laser provided on the substrate, which provides an optical signal having a wavelength;
a modulator having an output, the modulator being configured to receive a first portion of the optical signal and provide a first modulated output at the output of the modulator;
a multiplexer circuit coupled to the modulator, the multiplexer circuit configured to receive the first modulated output signal and provide a first multiplexed output signal at the output of the transceiver in response to the first modulated output signal;
a polarization rotator circuit that rotates a polarization of first multiplexed output signal;
a demultiplexer circuit configured to receive a second multiplexed output signal at the input of the transceiver and provide a second modulated output signal, the second multiplexed output signal the second modulated output signal being a portion of the second multiplexed output signal;
an optical hybrid circuit provided on the substrate, the optical hybrid having first and second inputs, the optical hybrid circuit configured to receive a second portion of the optical signal at the first input and the second modulated output signal at the second input.

2. The transceiver of claim 1, further comprising an optical coupler provided on the substrate, the optical coupler configured to receive the optical signal from the laser on a first input and provide first, second, and third portions of the optical signal on first, second, and third outputs of the optical coupler.

3. The transceiver of claim 1, further comprising an electro-optic element provided on the substrate, the electro-optic element coupled to receive the optical signal from the laser and modify the optical signal prior to providing the optical signal to the multiplexer circuit.

4. The transceiver of claim 3, wherein the electro-optic element is an amplitude varying element.

5. The transceiver of claim 3, wherein the electro-optical element comprises a semiconductor optical amplifier.

6. The transceiver of claim 3, wherein the electro-optical element comprises a variable optical attenuator.

7. The transceiver of claim 3, wherein the electro-optical element comprises a photodiode.

8. The transceiver of claim 1, further comprising a control system circuit, the optical signal being a first optical signal, the laser configured to output a second optical signal having the wavelength, the control system circuit configured to receive the second optical signal and provide an output in response to the received second optical signal.

9. The transceiver of claim 8, wherein the output of the control system controls a temperature of the laser.

10. The transceiver of claim 8, wherein the output of the control system controls a current provided to the laser.

11. The transceiver of claim 1, wherein the multiplexer circuit is provided on the substrate.

12. The transceiver of claim 1, wherein the demultiplexer circuit is provided on the substrate.

13. The transceiver of claim 1, wherein the laser is a DFB laser or a DBR laser.

14. A transceiver having an input and an output, comprising:
a substrate;
a laser provided on the substrate, which provides first and second optical signals, the first optical signal having a first wavelength and the second optical signal having a second wavelength, the first and second wavelength being substantially the same;
a modulator having an output, the modulator configured to receive the first optical signal and provide a first modulated output signal at the output of the modulated;
a multiplexer circuit coupled to the modulator that has a plurality of inputs and an output, the multiplexer circuit receives the first modulated output signal at one of the inputs and supplies the output first modulated output signal at the output of the multiplexer circuit,
a polarization rotator configured to receive the first modulated output signal from the output of the multiplexer circuit and rotate a polarization of the first modulated output signal prior to being output from the transceiver;
a demultiplexer circuit configured to receive a second multiplexed output signal at the input of the transceiver and provide a second modulated output signal in response to the second multiplexed output signal;
an optical hybrid circuit provided on the substrate, the optical hybrid circuit including first and second inputs, the first input configured to receive a first portion of the second optical signal at the first input and the second modulated output signal on the second input.

15. The transceiver of claim 14, further comprising an optical coupler provided on the substrate, the optical coupler configured to receive the second optical signal from the laser on a first input and provide the first portion of the second optical signal to the optical hybrid circuit.

16. The transceiver of claim 15, further comprising an electro-optic element provided on the substrate, the electro-optic element coupled to receive the second optical signal from the laser and modify an amplitude of the second optical signal prior to providing the second optical signal to the optical coupler.

17. The transceiver of claim 16, wherein the electro-optic element comprises a semiconductor optical amplifier.

18. The transceiver of claim 16, wherein the electro-optic element comprises a variable optical attenuator.

19. The transceiver of claim 16, wherein the electro-optic element comprises a photodiode.

20. The transceiver of claim 15, wherein the optical coupler is further configured to provide a third portion of the second optical signal, the transceiver further comprising a control system circuit configured to receive the third portion and provide an output in response to the received third portion of the second optical signal.

21. The transceiver of claim 20, wherein the output of the control system circuit controls a temperature of the laser.

22. The transceiver of claim 20, wherein the output of the control system circuit controls a current provided to the laser.

23. The transceiver of claim 14, wherein the multiplexer circuit is provided on the substrate.

24. The transceiver of claim 14, wherein the demultiplexer circuit is provided on the substrate.

25. The transceiver of claim 14, wherein the laser is a DFB laser or a DBR laser.

26. A transceiver having an input and an output, the transceiver further comprising:
a substrate;
a plurality of lasers provided on the substrate, each providing one of a plurality of optical outputs at a respective one of a plurality of wavelengths;
a plurality of modulators provided on the substrate, each having an output and each configured to receive a first portion of a corresponding one of the plurality of optical outputs and provide a corresponding one of a plurality of first modulated output signals;
a multiplexer circuit coupled to each of the plurality of modulators, the multiplexer circuit configured to receive each of the plurality of first modulated output signals and provide a first multiplexed output signal;
a polarization rotator that receives the first multiplexed output signal and rotates a polarization of each of the plurality of first modulated output signals included in the first multiplexed output signal; and
a demultiplexer circuit configured to receive a second multiplexed output signal at the input of the transceiver and provide a plurality of second modulated output signals in response to the second multiplexed output signal; and
a plurality of optical hybrid circuits provided on the substrate, each having first and second inputs, each configured to receive a second portion of a corresponding one of the plurality of optical signals on the first input and a corresponding one of the plurality of second modulated output signals on the second input.

27. The transceiver of claim 26, further comprising a plurality of optical couplers provided on the substrate, each configured to receive a respective one of the plurality of optical signals on the input and provide the second portion of the corresponding one of the plurality of optical signals to each of the optical hybrid circuits.

28. The transceiver of claim 27, further comprising an electro-optic element provided on the substrate, the electro-optic element coupled to receive a corresponding one of the plurality of optical signals and modify an amplitude of the corresponding one of the plurality of optical signals prior to providing the corresponding one of the plurality of optical signals to a corresponding one of the plurality of optical couplers.

29. The transceiver of claim 28, wherein the electro-optical element comprises a semiconductor optical amplifier.

30. The transceiver of claim 28, wherein the electro-optical element comprises a variable optical attenuator.

31. The transceiver of claim 28, wherein the electro-optical element comprises a photodiode.

32. The transceiver of claim 26, wherein the multiplexer circuit is provided on the substrate.

33. The transceiver of claim 26, wherein the demultiplexer circuit is provided on the substrate.

34. The transceiver of claim 26, wherein each of the plurality of lasers is a DFB laser or a DBR laser.

* * * * *